(12) United States Patent
Dhariwal et al.

(10) Patent No.: US 11,472,160 B2
(45) Date of Patent: Oct. 18, 2022

(54) ENVIRONMENT-FRIENDLY POLYMERIC COMPOSITES

(71) Applicant: CREATIVE PLASTICS, Pune (IN)

(72) Inventors: Prakash Rasiklal Dhariwal, Pune (IN); Milind Ganesh Bhole, Pune (IN); Sharad Shrikant Kulkarni, Pune (IN)

(73) Assignee: CREATIVE PLASTICS, Pune (IN)

( * ) Notice: Subject to any disclaimer, the term of this patent is extended or adjusted under 35 U.S.C. 154(b) by 0 days.

(21) Appl. No.: 16/633,918

(22) PCT Filed: Jul. 31, 2018

(86) PCT No.: PCT/IB2018/055717
§ 371 (c)(1),
(2) Date: Jan. 24, 2020

(87) PCT Pub. No.: WO2019/025962
PCT Pub. Date: Feb. 7, 2019

(65) Prior Publication Data
US 2021/0086480 A1 Mar. 25, 2021

(30) Foreign Application Priority Data
Aug. 1, 2017 (IN) .............................. 201721027358

(51) Int. Cl.
*B32B 15/08* (2006.01)
*B32B 15/12* (2006.01)
(Continued)

(52) U.S. Cl.
CPC .............. *B32B 15/08* (2013.01); *B32B 15/12* (2013.01); *B32B 15/20* (2013.01); *B32B 38/145* (2013.01);
(Continued)

(58) Field of Classification Search
CPC ......... B32B 15/08; B32B 15/12; B32B 15/20; B32B 27/10; B32B 2307/718;
(Continued)

(56) References Cited

U.S. PATENT DOCUMENTS 6,322,899 B1 * 11/2001 Karhuketo .............. B32B 27/08
428/475.2
8,409,676 B2 * 4/2013 Furneaux ................ B32B 23/08
428/34.2
(Continued)

FOREIGN PATENT DOCUMENTS

CN 102639594 A 8/2012
GB 2485336 A * 5/2012 ............. B05D 5/067

OTHER PUBLICATIONS

ISA/IN, PCT International Search Report and Written Opinion dated Nov. 19, 2018 issued in PCT International Application No. PCT/IB2018/055717 filed Jul. 31, 2018.

*Primary Examiner* — Catherine A. Simone
(74) *Attorney, Agent, or Firm* — Gottlieb, Rackman & Reisman, P.C.

(57) ABSTRACT

The present disclosure discloses an environment-friendly polymeric composite prepared using biodegradable, compostable and recyclable materials, yet having good mechanical properties. The polymeric composite of the present disclosure comprises a biodegradable and compostable multilayer first substrate comprising an inner later, an outer layer and a core layer; and a second substrate comprising at least one layer selected from metal layer, metallized layer, paper layer and pretreated paper layer, such that the second substrate is disposed on the outer layer of the multilayer first substrate. The present disclosure further discloses a packaging material comprising the polymeric composite suitable for packaging tobacco based products, pharmaceutical products and food products.

4 Claims, 1 Drawing Sheet

(51) Int. Cl.
*B32B 15/20* (2006.01)
*B32B 38/00* (2006.01)

(52) U.S. Cl.
CPC ....... *B32B 2250/03* (2013.01); *B32B 2255/12* (2013.01); *B32B 2255/26* (2013.01); *B32B 2307/718* (2013.01); *B32B 2307/7163* (2013.01); *B32B 2307/732* (2013.01); *B32B 2439/70* (2013.01)

(58) Field of Classification Search
CPC .......... B32B 2307/732; B32B 2255/26; B32B 2255/12; B32B 2250/03; B32B 2307/7163; B32B 2439/70; B65D 65/466
USPC ................................................ 428/34.2, 511
See application file for complete search history.

(56) References Cited

U.S. PATENT DOCUMENTS

2012/0045604 A1* 2/2012 Gavel ........................ C09J 7/29
428/41.8
2013/0260106 A1* 10/2013 Bohrer ................. B32B 23/046
428/192

* cited by examiner

ENVIRONMENT-FRIENDLY POLYMERIC COMPOSITES

CROSS-REFERENCE TO RELATED APPLICATIONS

This application is the United States National Stage entry under 35 U.S.C. 371 of PCT/IB 2018/055717, filed Jul. 31, 2018, which in turn claims the priority of Indian Patent Application No. 201721027358, filed Aug. 1, 2017, the contents of each of which are hereby incorporated by reference in their entirety.

FIELD

The present disclosure relates to polymeric composites, particularly, those useful in the packaging of tobacco based products and in the pharmaceutical and food industry.

DEFINITIONS

As used in the present disclosure, the following terms are generally intended to have the meaning as set forth below, except to the extent that the context in which they are used indicate otherwise.

Biodegradability: Biodegradability refers to the ability of materials to completely break down and decompose into natural elements by biological means. These materials can be solids biodegrading into the soil or liquids biodegrading into water. A biodegradable polymer is intended to break up in the presence of microorganisms.

Compostability: Compostability refers to the ability of materials to break down to nutrient rich mass (humus) in a short span of time when provided with composting conditions.

Laminate: A laminate is a polymeric composite material of a number of multilayer substrates in which the functional properties of the individual multilayer substrate combine to achieve the suitable requirements for packaging.

Pre Treated paper: Paper of various grades including ARSR paper and having a weight in the range of 30 gsm to 200 gsm, pretreated/coated with clay, pigments and/or polymer coatings for better surface consistency and print effect outcomes.

ARSR paper: ARSR paper means alkali resistant soap resistant paper. ARSR paper bears high degree of resistance to alkali.

Metallized layer: In the context of the present disclosure, it is defined as a metal layer which can be either deposited or can be a ready to use layer to be laminated over the outer surface layer of the biodegradable and compostable multilayer film.

BACKGROUND

The background information herein below relates to the present disclosure but is not necessarily prior art.

Conventionally, polymeric composites are prepared using naphtha based polymeric films to which are affixed a metal, metalized layer, polymer or a paper layer. Today, biodegradable polymeric films are slowly catching up as a promising substitute to the conventional naphtha based non-biodegradable polymers. They are readily degradable in soil and water without producing any harmful waste.

However, in comparison to the conventional naphtha based polymers, biodegradable polymers have been found to lack in mechanical properties. Also, due to their poor melt strength, it is very difficult to carry out melt processing of the biodegradable polymer resins.

There are a few biodegradable resins that have been successfully made into films. However, such films have not been used, particularly, for packaging of tobacco based products and have been scarcely used in the pharmaceutical and food industry. These films are found to be completely incompatible and non-resistant to corrosive ingredients in medicines, acidic food products and tobacco based products. Also, these films are unable to overcome the challenges of some of the processing methods like co-extrusion and lamination as well as packaging methods like high and ultra-high speed form fill seal (FFS)/automatic pick fill seal packaging machines having varying sealing mechanisms and systems with the requirement of accomplishing the required/desired functional sealability.

Hence, there is a felt need for a polymeric composite that is, simultaneously, environment-friendly, yet exhibits excellent mechanical properties, excellent surface properties, high tear resistance, inertness and high compatibility towards corrosive ingredients and is suitable for use in the tobacco based products, pharmaceutical and food industry.

OBJECTS

Some of the objects of the present disclosure, which at least one embodiment herein satisfies, are as follows.

It is an object of the present disclosure to ameliorate one or more problems of the prior art or to at least provide a useful alternative.

An object of the present disclosure is to provide an environment-friendly polymeric composite that is prepared using biodegradable, compostable and recyclable materials.

Another object of the present disclosure is to provide environment-friendly polymeric composite that is suitable as a packaging material and is non-reactive with the packaged ingredients.

Still another object of the present disclosure is to provide an environment-friendly polymeric composite that is useful for packaging of tobacco based products, pharmaceutical and food products.

Yet another object of the present disclosure is to provide a process for preparing an environment-friendly polymeric composite.

Other objects and advantages of the present disclosure will be more apparent from the following description, which is not intended to limit the scope of the present disclosure.

SUMMARY

The present disclosure provides an environment-friendly polymeric composite.

The polymeric composite comprises a multilayer first substrate being biodegradable and compostable; and a second substrate comprising at least one layer selected from a metal layer, a metallized layer, a paper layer and a pretreated paper layer. The multilayer polymeric composite further comprises a third substrate comprising at least one layer selected from a metal layer, a metallized layer, a paper layer, a pretreated paper layer and a protective coating layer.

The multilayer first substrate comprises an inner later, an outer layer and a core layer, having thickness in the range of 12 μm to 100 μm.

The second substrate comprises at least one layer selected from metal layer, a metallized layer, a paper layer and a pretreated paper layer. The thickness of the metal layer is in the range of 0.001 μm to 100 μm. The weight of the paper layer is in the range of 30 gsm to 120 gsm. The second substrate is disposed on the outer layer of the multilayer first substrate.

The third substrate comprises at least one layer selected from metal layer, a metallized layer, a paper layer, a pretreated paper layer and a protective coating layer. The thickness of the metal layer is in the range of 0.001 μm to 100 μm. The weight of the paper layer is in the range of 30 gsm to 120 gsm. The third substrate is disposed on the outer layer of the second substrate.

The metal layer or metallized layer of the second substrate is selected from the group consisting of aluminium, aluminium alloys and aluminium oxides.

The paper layer or pretreated paper of the second substrate is selected from the group consisting of a coated paper, an uncoated paper, a pretreated paper, and ARSR paper.

The protective coating layer is selected from acrylic coating and varnish coating.

In one embodiment, the polymeric composite of the present disclosure comprises the multilayer polymeric film having thickness in the range of 15 μm to 35 μm; the metal layer having thickness in the range of 7 μm to 30 μm; the paper layer having a weight in the range of 30 gsm to 120 gsm; and the protective coating layer.

The present disclosure further provides a process for preparing a polymeric composite.

In one embodiment, the process for preparing a polymeric composite comprises printing the second substrate with pre-defined design to obtain a printed substrate; followed by depositing the printed substrate on an outer layer of a first substrate to obtain the polymeric composite.

In first embodiment, the process step of depositing the printed substrate on an outer layer of a first substrate comprises laminating a second substrate on an outer layer of a first substrate by lamination method at a speed in the range of 100 to 200 mtrs/min, at a pressure in the range of 3 to 5 bar and at a viscosity in range of 18 to 20 sec. The lamination is carried out by at least one method selected from solvent less method and solvent based method.

In second embodiment, the process step of depositing the printed substrate on an outer layer of a first substrate comprises extrusion coating and/or metllization of the first substrate to form the second substrate.

In another embodiment, the process for preparing a polymeric composite comprises depositing the third substrate on an outer layer of the second substrate to obtained a combined substrate; followed by printing outer layer of the combined substrate with pre-defined designed to obtain a printed substrate. The so obtained printed substrate is then deposited on an outer layer of a first substrate to obtain the polymeric composite.

The process of the present disclosure optionally comprises the step of coating the outer layer of the polymeric composite with a protective coating layer.

The present disclosure also provides a packaging material comprising the polymeric composite suitable for packaging tobacco based products, pharmaceutical products and food products.

BRIEF DESCRIPTION OF THE ACCOMPANYING DRAWING

The present disclosure will now be described with the help of the accompanying drawing, in which.

LIST OF REFERENCE NUMERALS/LETTERS

Figure 1:
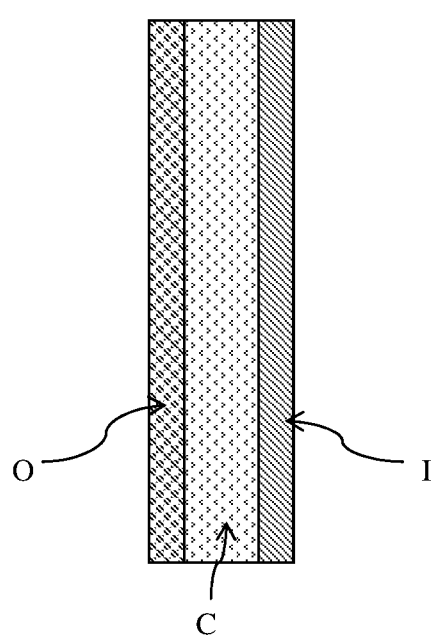
FIG. 1 illustrates a representation of a three layered first substrate.
Figure 2:
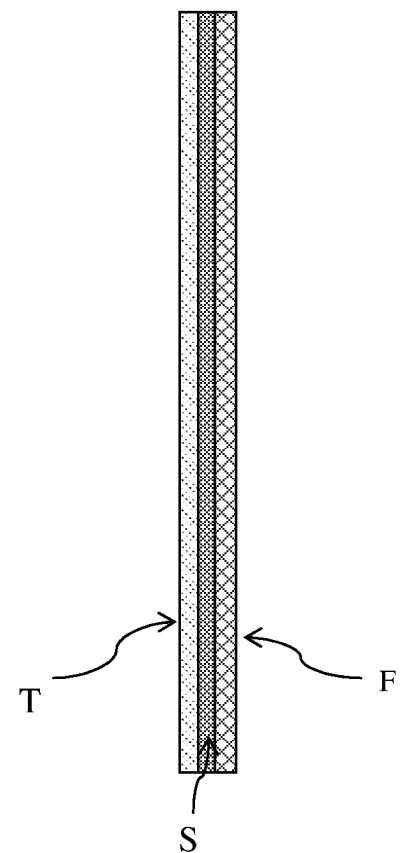
FIG. 2 illustrates a representation of a polymeric composite of the present disclosure.

| Reference Letter | Reference |
| --- | --- |
| F | First substrate |
| S | Second substrate |
| T | Third substrate |
| I | Inner layer |
| O | Outer layer |
| C | Core layer |

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details, are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise.

The terms "comprises," "comprising," "including," and "having," are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

When an element is referred to as being "mounted on," "engaged to," "connected to," or "coupled to" another element, it may be directly on, engaged, connected or coupled to the other element. As used herein, the term "and/or" includes any and all combinations of one or more of the associated listed elements.

The terms first, second, third, etc., should not be construed to limit the scope of the present disclosure as the aforementioned terms may be only used to distinguish one element, component, region, layer or section from another component, region, layer or section. Terms such as first, second, third etc., when used herein do not imply a specific sequence or order unless clearly suggested by the present disclosure.

Terms such as "inner," "outer," "beneath," "below," "lower," "above," "upper," and the like, may be used in the present disclosure to describe relationships between different elements as depicted from the figures.

In one aspect, the present disclosure envisages an environment-friendly polymeric composite having good mechanical properties.

The polymeric composite of the present disclosure comprises a biodegradable and compostable multilayer first substrate; a second substrate and optionally a third substrate.

In accordance with the present disclosure, the first substrate comprises an inner layer, an outer layer and at least one core layer disposed between the inner layer and the outer layer. Further, the inner layer, the outer layer and the core layer independently comprise at least one blend selected from a first blend of polylactic acid and a copolyester of 1,4-butanediol, adipic acid, and terephthalic acid having a melt temperature in the range of 165° C. to 190° C.; a second blend of polylactic acid and a copolyester of 1,4-butanediol, adipic acid, and terephthalic acid having a melt temperature in the range of 190° C. to 200° C.; a third blend of polylactic acid and a copolyester of 1,4-butanediol, adipic acid, and terephthalic acid having a melt temperature in the range of 165° C. to 170° C.; a fourth blend of polylactic acid and a copolyester of 1,4-butanediol, adipic acid, and terephthalic acid having a melt temperature in the range of 180° C. to 190° C.; a fifth blend of polylactic acid and a copolyester of 1,4-butanediol, adipic acid, and terephthalic acid having a melt temperature in the range of 175° C. to 195° C.; and a sixth blend of polylactic acid and a copolyester of 1,4-butanediol, adipic acid, and terephthalic acid having a melt temperature in the range of 180° C. to 200° C.

In accordance with the present disclosure, the thickness of the first substrate is in the range of 12 μm to 100 μm, preferably in the range of 20 m to 50 μm.

In accordance with the present disclosure, the second substrate comprises at least one layer selected from a metal layer, a metallized layer, a paper layer, and a pretreated paper layer. The thickness of the metal layer is in the range of 0.001 μm to 100 μm, preferably in the range of 20 μm to 50 μm. The weight of the paper pretreated paper layer is in the range of 30 gsm to 120 gsm, preferably in the range of 30 gsm to 60 gsm.

In accordance with the present disclosure, the second substrate is disposed on the outer layer of the first substrate.

In accordance with one embodiment of the present disclosure, the second substrate comprises at least one metal layer or metallized layer selected from the group consisting of aluminium, aluminium alloys and aluminum oxides, preferably aluminium metal layer.

In accordance with another embodiment of the present disclosure, the second substrate comprises at least one paper layer or pretreated paper layer selected from the group consisting of coated paper, uncoated paper, pretreated paper, and ARSR paper.

In accordance with yet another embodiment of the present disclosure, the second substrate comprises a combination of metal layer and a paper layer, wherein paper layer is provided on metal layer.

In accordance with the present disclosure, the third substrate comprises a protective coating layer. The protective coating layer is selected from acrylic coating and varnish coating.

In accordance with the embodiments of the present disclosure, the polymeric composite comprises a multilayer polymeric film having thickness in the range of 15 μm to 30 μm; a metal layer having thickness in the range of 5 μm to 30 μm; a paper layer having a weight in the range of 30 gsm to 120 gsm; and a protective coating layer.

In second aspect, the present disclosure provides a process for preparing a polymeric composite. The process is disclosed in detail herein below:

Step 1: Preparation of the First Substrate

The first substrate can be prepared by any process selected from the group consisting of blown film co-extrusion, cast film co-extrusion and hot lamination.

An inner layer extruder, an outer layer extruder and a core layer extruder are used for extruding the inner layer, the outer layer and the core layer respectively. At least one blend independently selected the group of the first blend, the second blend, the third blend, the fourth blend, the fifth blend, and the sixth blend is introduced through each of the inner layer extruder, the outer layer extruder, and the core layer extruder. In addition, at least one slip additive selected from the group consisting of erucamide and oleamide is also introduced into the inner layer extruder. Thereafter, the inner layer extruder, an outer layer extruder, and the core layer extruder are heated to a predetermined temperature ranging from 140° C. to 210° C. for blown film co-extrusion and 130° C. and 300° C. for cast film co-extrusion followed by extruding to obtain an inner layer extrudate, an outer layer extrudate, and a core layer extrudate from the respective extruder. The extrudates, so obtained, are passed through a die to form a multilayer biodegradable and compostable extrudates. The multilayer extrudates are cooled to a temperature in the range of 5° C. to 40° C. to obtain the biodegradable and compostable multilayer film.

The biodegradable and compostable multilayer film thus prepared constitutes the first substrate of the environment-friendly polymeric composite of the present disclosure.

Step 2: Preparation of the Polymeric Composite

The first substrate, i.e. the multilayer film is unwound from a roll and is subject to deposition of the second substrate on the outer layer of the first substrate.

In one embodiment, the second substrate is printed with pre-defined design to obtain a printed substrate. The printing can be carried out by at least one method selected from the group consisting of roto-gravure method, flexo method, offset method and the like. The so obtained printed substrate is deposited on an outer layer of a first substrate to obtain the polymeric composite.

In another embodiment, the process for preparing a polymeric composite comprises depositing the third substrate on an outer layer of the second substrate to obtained a combined substrate; followed by printing outer layer of the combined substrate with pre-defined designed to obtain a printed substrate. The so obtained printed substrate is then deposited on an outer layer of a first substrate to obtain the polymeric composite.

The process of the present disclosure optionally comprises the step of coating the outer layer of the polymeric composite with a protective coating layer.

In first embodiment, the process step of depositing the printed substrate on an outer layer of the first substrate is carried out by laminating a second substrate on an outer layer of a first substrate by lamination method at a speed in the range of 100 to 200 mtrs/min, at a pressure in the range of 3 to 5 bar and at a viscosity in range of 18 to 20 sec. In accordance with the present disclosure, the lamination is carried out by at least one method selected from solvent less method and solvent based method.

The outer layer of the first substrate can be subject to at least one treatment selected from plasma treatment and corona treatment before deposition of the second substrate on the outer layer of the first substrate to promote better adhesion between the first and the second substrates.

The lamination was carried out with the help of adhesives. In accordance with the present disclosure, the solvent-less based adhesive system is significantly better than the solvent based adhesive to achieve a stable and consistent laminate.

In second embodiment, the process the process step of depositing the printed substrate on an outer layer of the first substrate is carried out by extrusion coating and/or metllization of the first substrate to form the second substrate.

In a third aspect, the present disclosure provides a packaging material prepared from the polymeric composite.

The polymeric composite of the present disclosure is suitable for use as a packaging material for tobacco based product, pharmaceutical products and food products. The polymeric composite of the present disclosure can be used for flexible as well as rigid packaging.

The polymeric composite of the present disclosure is environment-friendly. All ingredients of the polymeric composite are either, biodegradable and compostable, or can be recycled. The metal layer or paper layer attached on the multilayer polymeric film of the first substrate can be easily peeled off or removed, and can be recycled. The multilayer polymeric film can then be subjected to composting. The multilayer polymeric film can be composted within 90 days.

This renders the polymeric composite of the present disclosure environment-friendly as all the constituents can either be composted or recycled.

The present disclosure is further described in light of the following experiments which are set forth for illustration purpose only and not to be construed for limiting the scope of the disclosure. The following experiments can be scaled up to industrial/commercial scale and the results obtained can be extrapolated to industrial scale.

EXPERIMENTAL DETAILS

Example 1: Preparation of a Biodegradable and Compostable Multilayer First Substrate Three biodegradable and compostable multilayer first substrates, having width of 955 mm and a thickness of 20, 25 and 30 micron respectively were prepared.

Blends comprising polylactic acid and a copolyester of 1,4-butanediol, adipic acid, and terephthalic acid were used as resin material. For the melt mixing of these blends, an inner layer extruder, an outer layer extruder, and a core layer extruder were employed. In the core layer extruder, a first blend was melt mixed at a temperature of 187° C. to obtain a first melt. In the outer layer extruder, blends were melt mixed at a temperature of 197° C. to obtain a second melt. In the inner layer extruder, blend along with erucamide as slip additive were melt mixed at a temperature of 197° C. to obtain a third melt. The first, the second, and the third melts were extruded separately to obtain a core layer extrudate, an outer layer extrudate, and an inner layer extrudate respectively. These extrudates were then passed through a co-extrusion stack type die head in such a way that the core layer extrudate was laid over the inner layer extrudate to result in the multilayer film extrudate with the third melt comprising the slip additive forming the inner layer and the second melt forming the outer layer. The first melt forms the core layer of the multilayer film extrudate.

This multilayer film extrudate was then cooled at a temperature of 25° C. to obtain a biodegradable and compostable multilayer first substrate.

Example 2: Preparation of Environment-Friendly Polymeric Composite in Accordance with the Present Disclosure Experiments 1-16

The second substrate comprising metal layer or paper layer was laminated on an outer layer of a first substrate prepared in experiment 1, by solvent less lamination method at a speed in the range of 175 to 200 mtrs/min, at a pressure of 5 bar and at a viscosity of 18 sec to obtain environment-friendly polymeric composite of the present disclosure.

The characteristics of the so obtained polymeric composites 1-16 are tabulated in Table 1 given below.

Comparative Experiment 17-19

Same experimental procedure as described above was followed except the lamination machine speed.

The characteristics of the so obtained polymeric composites 17-19 are tabulated in Table 1 given below.

Comparative Experiment 20

Same experimental procedure as described above was followed except the solvent based lamination method was used.

The characteristics of the so obtained polymeric composite 20 are tabulated in Table 1 given below.

Comparative Experiment 21

Same experimental procedure as described above was followed except the first substrate comprises polyethylene.

The characteristics of the so obtained polymeric composite 21 are tabulated in Table 1 given below.

Thickness/weight of second substrate.

TABLE 1

| Ex. No. | First substrate | Second substrate | Thickness of first substrate | Thickness of second substrate | Lamination machine speed | Lamination method | Remarks |
| --- | --- | --- | --- | --- | --- | --- | --- |
| 1 | prepared in example 1 | aluminuim layer | 20 (μm) | 9 (μm) | 200 | solvent-less | Stable composite |
| 2 | prepared in example 1 | aluminuim layer | 20 (μm) | 12 (μm) | 200 | solvent-less | Stable composite |
| 3 | prepared in example 1 | coated paper | 20 (μm) | 65 (gsm) | 200 | solvent-less | Stable composite |
| 4 | prepared in example 1 | coated paper | 22 (μm) | 65 (gsm) | 200 | solvent-less | Stable composite |
| 5 | prepared in example 1 | Coated paper layer/ aluminium layer | 20 (μm) | 65 (gsm)/ 9 (μm) | 200 | solvent-less | Stable composite |

TABLE 1-continued

| Ex. No. | First substrate | Second substrate | Thickness of first substrate | Thickness of second substrate | Lamination machine speed | Lamination method | Remarks |
|---|---|---|---|---|---|---|---|
| 6 | prepared in example 1 | Coated paper layer/ aluminium layer | 20 (μm) | 65 (gsm)/ 12 (μm) | 200 | solvent-less | Stable composite |
| 7 | prepared in example 1 | Coated paper layer/ aluminium layer | 20 (μm) | 65 (gsm)/ 20 (μm) | 200 | solvent-less | Stable composite |
| 8 | prepared in example 1 | Coated paper layer/ aluminium layer | 20 (μm) | 65 (gsm)/ 25 (μm) | 200 | solvent-less | Stable composite |
| 9 | prepared in example 1 | Coated paper layer/ aluminium layer | 25 (μm) | 35 (gsm)/ 9 (μm) | 200 | solvent-less | Stable composite |
| 10 | prepared in example 1 | Coated paper layer/ aluminium layer | 25 (μm) | 50 (gsm)/ 9 (μm) | 200 | solvent-less | Stable composite |
| 11 | prepared in example 1 | Coated paper layer/ aluminium layer | 25 (μm) | 65 (gsm)/ 9 (μm) | 200 | solvent-less | Stable composite |
| 12 | prepared in example 1 | Coated paper layer/ aluminium layer | 25 (μm) | 90 (gsm)/ 9 (μm) | 200 | solvent-less | Stable composite |
| 13 | prepared in example 1 | Coated paper layer/ aluminium layer | 20 (μm) | 65 (gsm)/ 9 (μm) | 200 | solvent-less | Stable composite |
| 14 | prepared in example 1 | Coated paper layer/ aluminium layer | 25 (μm) | 65 (gsm)/ 9 (μm) | 200 | solvent-less | Stable composite |
| 15 | prepared in example 1 | Coated paper layer/ aluminium layer | 30 (μm) | 65 (gsm)/ 9 (μm) | 200 | solvent-less | Stable composite |
| 16 | prepared in example 1 | Coated paper layer/ aluminium layer | 25 (μm) | 65 (gsm)/ 9 (μm) | 175 | solvent-less | Stable composite |
| 17 | prepared in example 1 | Coated paper layer/ aluminium layer | 25 (μm) | 65 (gsm)/ 9 (μm) | 100 | solvent-less | Unstable composite |
| 18 | prepared in example 1 | Coated paper layer/ aluminium layer | 25 (μm) | 65 (gsm)/ 9 (μm) | 125 | solvent-less | Unstable composite |
| 19 | prepared in example 1 | Coated paper layer/ aluminium layer | 25 (μm) | 65 (gsm)/ 9 (μm) | 150 | solvent-less | Unstable composite |
| 20 | prepared in example 1 | Coated paper layer/ aluminium layer | 25 (μm) | 65 (gsm)/ 9 (μm) | 100 | solvent-based | Unstable composite |
| 21 | polyethylene | Coated paper layer/ aluminium layer | 35 (μm) | 65 (gsm)/ 9 (μm) | 200 | solvent-less | Stable composite |

From experiments 5-15, it was observed that the there is no negative effect on the polymeric composite due to change in thickness of aluminium layer, or paper layer or multilayer first substrate.

Further, it was observed from experiments 17-19 that lower lamination machine speed leads to unstable polymeric composite.

Further, it was observed from experiment 20 that the solvent based lamination method leads to low quality polymeric composite.

Comparative experiment 21 comprises conventional polyethylene film, which is not compostable.

Example 3: Biodegradability and Compostability Testing of the Polymeric Composite the Present Disclosure The polymeric composites prepared in experiment 13 and 14 were drawn and placed in appropriately marked soil pits. The second substrate was easily separated from the first substrate after 12 weeks. The separated second substrate was recycled and reused.

The first substrate was further tested for biodegradability and compostability. Samples were drawn for the testing at frequency of 4 weeks.

The results of the biodegradability and compostability testing of the samples are summarized below in table 2:

TABLE 2

| | | | | | | | | | |
|---|---|---|---|---|---|---|---|---|---|
| Biodegradability and compostability testing of the polymeric composite | | | | | | | | | |
| Ex. No. | Polymeric composite | Parameters | | Time (weeks) | | | | | |
| | | | | 0 | 4 | 8 | 12 | 16 | 20 |
| 1 | Experiment 13 | Tensile strength (kg/cm$^2$) | MD | 440 | 490.13 | 334 | 365 | 332.5 | 312.65 |
| | | | TD | 285 | 326.66 | 273.4 | 289 | 302 | 265.3 |
| | | Elongation (%) | MD | 242 | 14.28 | 8.71 | 8.71 | 9.5 | 11.6 |
| | | | TD | 312 | 11.6 | 14.78 | 11.3 | 11.2 | 9.5 |
| | | Seal strength (kg/15 mm) | MD | 0.798 | 0.749 | 0.784 | 0.762 | 0.746 | 0.754 |
| | | | TD | 0.854 | 0.789 | 0.734 | 0.719 | 0.802 | 0.785 |
| 1 | Experiment 14 | Tensile strength (kg/cm$^2$) | MD | 450.2 | 336.26 | 261 | 297 | 285 | 293.76 |
| | | | TD | 210.11 | 342.13 | 134.6 | 251 | 229.3 | 184.32 |
| | | Elongation | MD | 140.41 | 181.66 | 13.2 | 11.6 | 11.6 | 11.6 |

TABLE 2-continued

Biodegradability and compostability testing of the polymeric composite

| Ex. No. | Polymeric composite | Parameters | | Time (weeks) | | | | | |
|---|---|---|---|---|---|---|---|---|---|
| | | | | 0 | 4 | 8 | 12 | 16 | 20 |
| | | (%) | TD | 130.22 | 19.62 | 24.3 | 19.2 | 23.1 | 63.1 |
| | | Seal strength | MD | 0.868 | 0.852 | 0.852 | 0.852 | 0.756 | 0.729 |
| | | (kg/15 mm) | TD | 0.884 | 0.824 | 0.76 | 0.734 | 0.652 | 0.652 |

MD: Machine direction;
TD: Transversal direction

From table 2, it is evident that the polymeric composite of the present disclosure is environment-friendly as all the constituents can either be composted or recycled.

The metal layer and paper layer attached on the multilayer first substrate are easily peeled off or removed, and then recycled. The multilayer first substrate is composted within 90 days.

Example 4: Material Stability Testing of the Polymeric Composite the Present Disclosure The polymeric composite of the present disclosure prepared in experiments 13-15 and 21 were used to manufacture packaging material i.e. pouches of size 70 mm×100 mmm. Each pouch was filled with 50 kg of tobacco based as well as tobacco free materials. All the pouches were kept in open air for 3 months, and then tested for seal integrity, color of the packed material and taste of the packed material.

The results are tabulated in table 3 below:

TABLE 3

Results of the material stability testing of the polymeric composite the present disclosure

| Ex. No. | Polymeric composite used for pouch | Seal integrity | | Color change | | Taste change | |
|---|---|---|---|---|---|---|---|
| | | Tobacco based | Tobacco free | Tobacco based | Tobacco free | Tobacco based | Tobacco free |
| 1 | 13 | OK | OK | NO | NO | NO | NO |
| 2 | 14 | OK | OK | NO | NO | NO | NO |
| 3 | 15 | OK | OK | NO | NO | NO | NO |
| 4 | 21 | OK | OK | NO | NO | NO | NO |

From table 3, it is evident that the polymeric composite of the present disclosure exhibited same level of seal integrity as that of the conventional composites (ex. No. 21) comprising polyethylene. Further, the polymeric composite of the present disclosure does not have any adverse effect on the color or the taste of the packed material.

Therefore, the polymeric composite of the present disclosure is suitable to be used as a packaging material for tobacco based products, pharmaceutical products and food products. Further, the polymeric composite of the present disclosure is environment-friendly.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

Technical Advancements

The present disclosure described herein above has several technical advantages including, but not limited to, the realization of an environment-friendly polymeric composite that:

- is prepared using biodegradable, compostable and recyclable materials, yet has good mechanical properties;
- is useful as a packaging material for tobacco based products; pharmaceutical products and food products; and
- is non-reactive with the contents of the package.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. An environment-friendly polymeric composite comprising:
    i. a multilayer first substrate, being biodegradable and compostable comprising an inner layer, an outer layer and a core layer; wherein the inner layer comprises at least one slip additive selected from the group consisting of erucamide and oleamide; wherein the inner layer, the outer layer and the core layer independently comprises a blend selected from the group consisting of;
        a first blend of polylactic acid and a copolyester of 1, 4-butanediol, adipic acid, and terephthalic acid having a melt temperature in the range of 165° C. to 190° C.;
        a second blend of polylactic acid and a copolyester of 1, 4-butanediol, adipic acid, and terephthalic acid having a melt temperature in the range of 190° C. to 200° C.;
        a third blend of polylactic acid and a copolyester of 1, 4-butanediol, adipic acid, and terephthalic acid having a melt temperature in the range of 165° C. to 170° C.;
        a fourth blend of polylactic acid and a copolyester of 1, 4-butanediol, adipic acid, and terephthalic acid having a melt temperature in the range of 180° C. to 190° C.;
        a fifth blend of polylactic acid and a copolyester of 1,4-butanediol, adipic acid, and terephthalic acid having a melt temperature in the range of 175° C. to 195° C.; and
        a sixth blend of polylactic acid and a copolyester of 1, 4-butanediol, adipic acid, and terephthalic acid having a melt temperature in the range of 180° C. to 200° C.; and
    ii. a second substrate comprising at least one layer selected from a metal layer, a metallized layer, and a paper layer;
        wherein, said second substrate is disposed on the outer layer of said first substrate;
    iii. a third substrate disposed on said second substrate;
        wherein said third substrate comprising at least one layer selected from a metal layer, a metallized layer, a paper layer a pretreated paper layer and a protective coating layer;
        wherein the thickness of:
            said first substrate is in the range of 12μm to 100 μm;
            said metal layer of second substrate is in the range of 0.001 μm to 100 μm; and
            said metal layer of said third substrate is in the range of 0.001 μm to 100 μm;
        wherein a weight of said paper layer of said second substrate is in the range of 30 gsm to 120 gsm; and
        wherein a weight of said paper layer of said third substrate is in the range of 30 gsm to 120 gsm.

2. The polymeric composite as claimed in claim 1, wherein said metal layer or said metallized layer of said second substrate and said third substrate is selected from the group consisting of aluminium, aluminium alloys, and aluminium oxides.

3. The polymeric composite as claimed in claim 1, wherein said paper layer of said second substrate and said third substrate is selected from the group consisting of coated paper, uncoated paper, pretreated paper, and alkali resistant soap resistant (ARSR) paper.

4. The polymeric composite as claimed in claim 1, wherein said protective coating layer of said third substrate is selected from acrylic coating, and varnish coating.

* * * * *